United States Patent [19]

Papasideris

[11] 4,214,227

[45] Jul. 22, 1980

[54] INSTRUMENT PANEL ASSEMBLY

[75] Inventor: Stamos I. Papasideris, Bristol, Ill.

[73] Assignee: Caterpillar Tractor Co., Peoria, Ill.

[21] Appl. No.: 917,135

[22] Filed: Jun. 19, 1978

Related U.S. Application Data

[63] Continuation-in-part of Ser. No. 675,026, Apr. 8, 1976, abandoned.

[51] Int. Cl.² .............................................. G08B 19/00
[52] U.S. Cl. .................................. 340/52 F; 340/514;
340/517; 340/79
[58] Field of Search ................ 340/52 F, 79, 80, 514,
340/517, 641, 642

[56] References Cited
U.S. PATENT DOCUMENTS

| | | | |
|---|---|---|---|
| 3,566,401 | 7/1968 | Smith et al. | 340/52 F |
| 3,597,729 | 12/1968 | Lopez | 340/52 F |
| 3,745,547 | 7/1973 | Hadank | 340/517 |
| 3,975,708 | 8/1976 | Lusk et al. | 340/80 |

Primary Examiner—Alvin H. Waring
Attorney, Agent, or Firm—Wegner, Stellman, McCord, Wiles & Wood

[57] ABSTRACT

An instrument panel assembly having a plurality of indicating elements and a test switch for concurrently indicating the operability of the individual indicating elements. A plurality of electrical devices is connected in association with the test switch and indicating elements so as to prevent false concurrent operation of the indicating elements. The assembly may include circuitry for causing an intermittent alarm as an additional test indication during the testing of one or more of the indicating elements.

18 Claims, 6 Drawing Figures

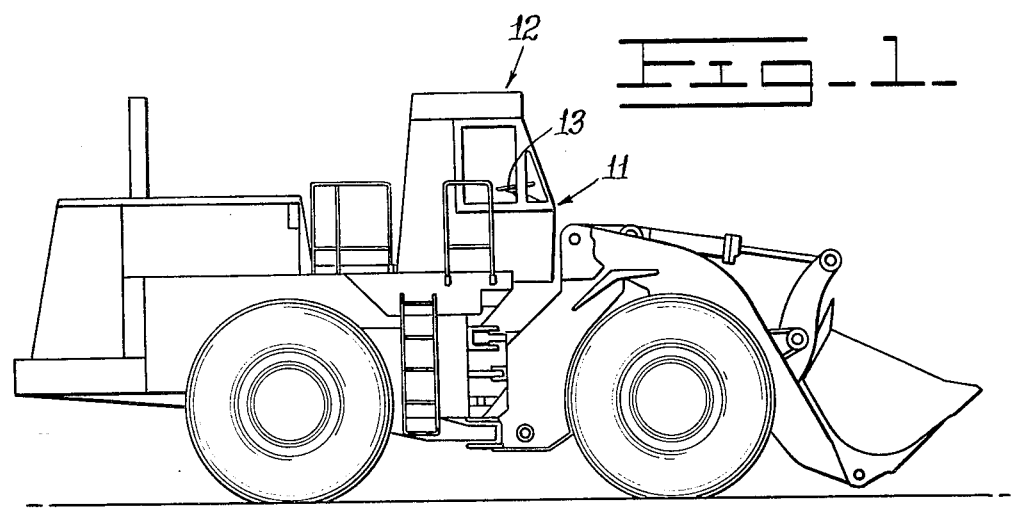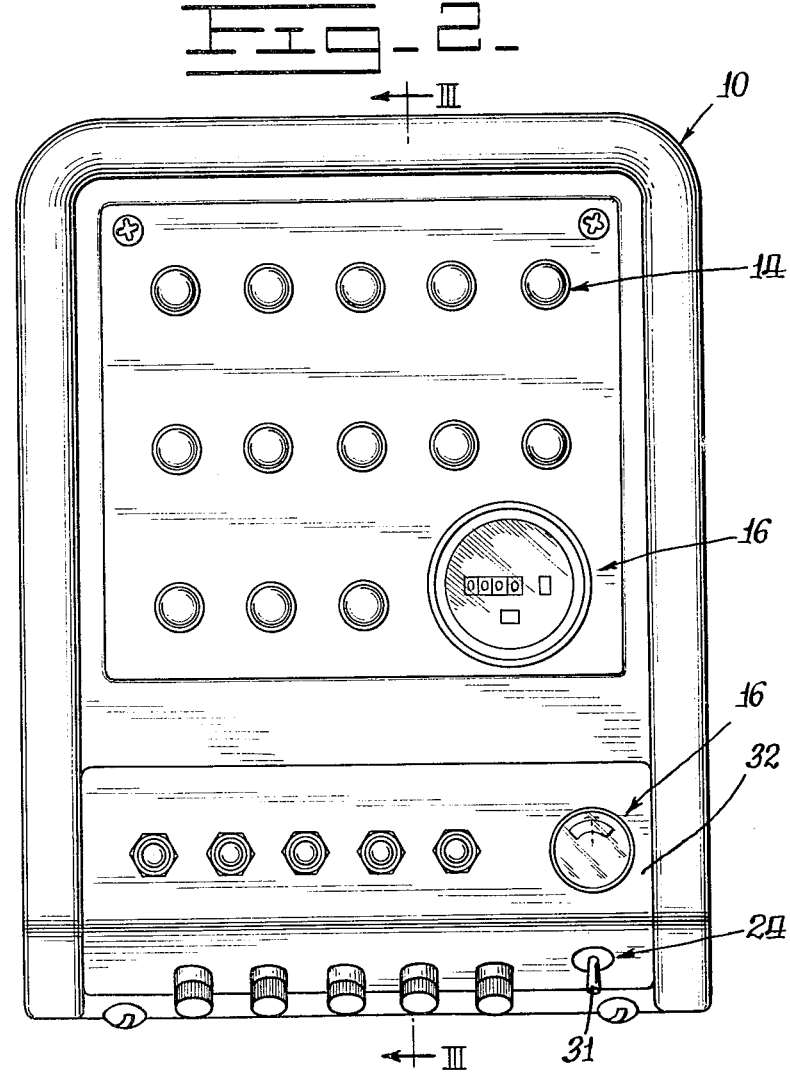

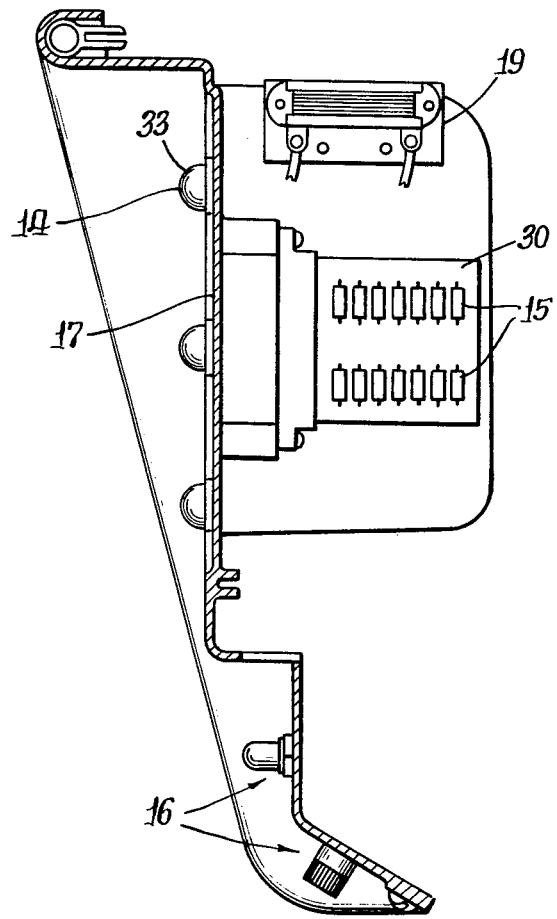
Fig_3_
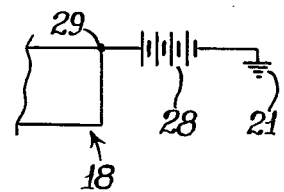
Fig_5_
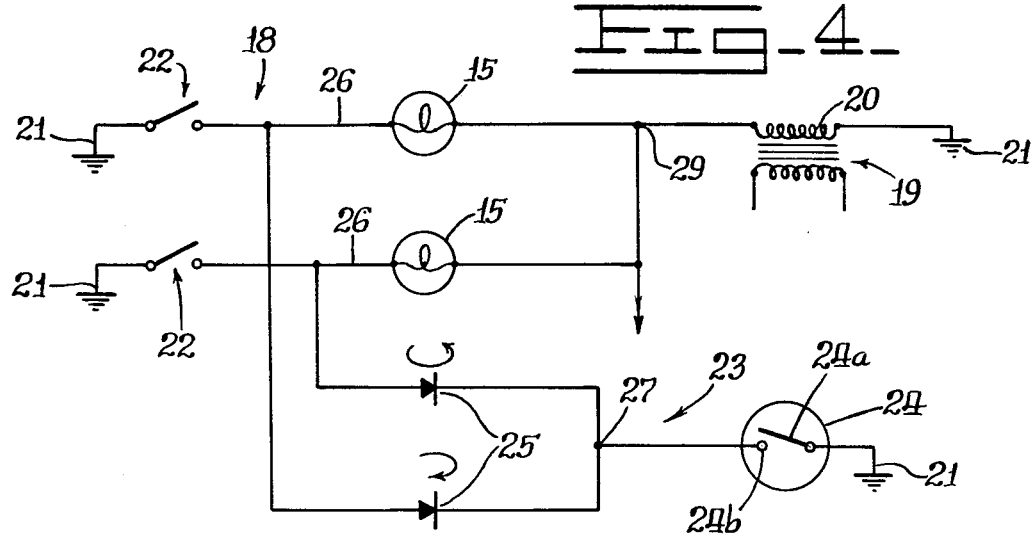
Fig_4_

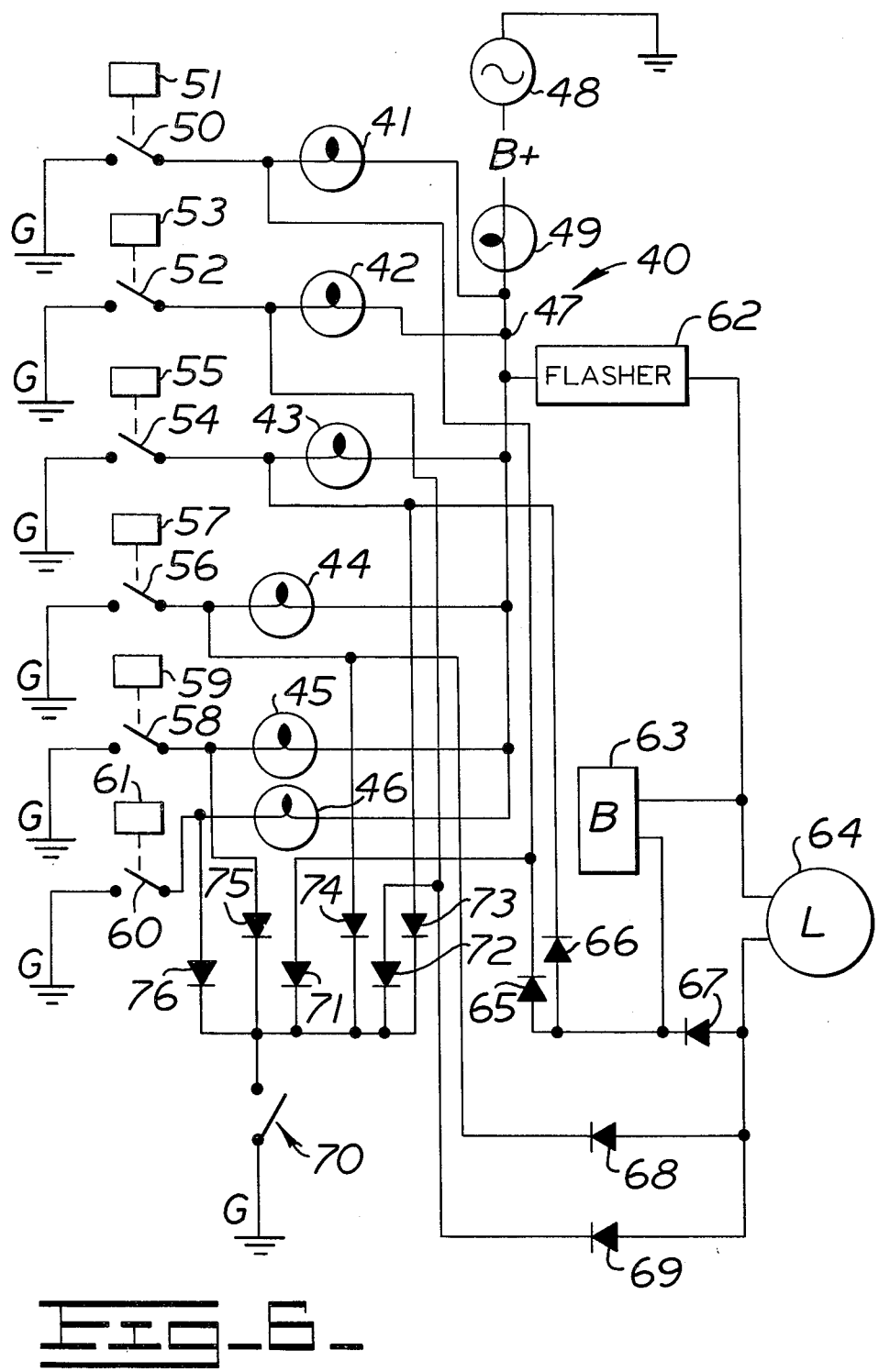
Fig_6_

INSTRUMENT PANEL ASSEMBLY

CROSS-REFERENCE TO RELATED APPLICATION

This application comprises a continuation-in-part of my copending application Ser. No. 675,026, filed Apr. 8, 1976, now abandoned, entitled INSTRUMENT PANEL ASSEMBLY.

BACKGROUND OF THE INVENTION

1. Field of the Invention

This invention relates to signaling systems which may include instrument panel assemblies having means for permitting selective testing of the operability of the indicating means and/or alarm means thereof.

2. Description of the Prior Art

In instrument panel assemblies of the prior art, a plurality of indicating lamps or the like may be mounted to a panel for indicating different conditions of associated equipment. Illustratively, in a vehicle, the instrument panel may include a plurality of indicating lamps arranged to indicate abnormal conditions, such as high oil temperature, etc.

In the commercial automobile field, such indicator lamps are considered to be somewhat unreliable relative to protecting the associated equipment in that a burnout or loose connection of the particular indicator lamp causes a failure of indication to the driver of a malfunction of the apparatus of the vehicle. Illustratively, where the indicator lamp provided to signal a low oil level condition burns out, the driver of the vehicle may not be properly apprised of such condition, causing serious and costly damage to the engine.

In U.S. Pat. No. 3,745,547 of Walter Robert Hadank, a lamp supervisory circuit is shown having a test switch which is connected through a plurality of indicating lamps. The control includes a supervisory circuit which is connected through a plurality of diodes to a corresponding plurality of indicating lamps. The control includes a supervisory circuit which operates to indicate a component failure in one of the branch circuits of the lamp supervisory circuit. An alarm is provided for indicating when one of the lamps fails so as to avoid a failure of the indicating system to provide the desired indicating function.

Irving F. Weiss discloses, in U.S. Pat. No. 3,040,243, a test circuit for an indicator system having means for activating all the indicators of a control panel simultaneously to ascertain their operating condition.

Allan Bennett, in U.S. Pat. No. 3,631,393, shows a vehicle lamp failure warning system having a first lamp circuit for illuminating the lamp and a second lamp circuit which is completed when the lamp is extinguished but has a resistance sufficiently high to insure that the lamp is not illuminated.

Tobias Wagner discloses a motor vehicle control light system in U.S. Pat. No. 3,320,586 including a signaling device mounted at the rear of the vehicle where it may be seen by other drivers so as to advise as to the intentions of the driver of the vehicle.

In U.S. Pat. No. 3,975,708, Joe F. Lusk et al show a vehicle condition monitoring system providing status information regarding the operability of headlights or taillights and the condition of the following trailer. The system may also be used to check the tire pressure and brake drum temperature. A memory circuit is provided for storing a fault condition and a diagnostic unit may be used subsequently to detect the condition of the memory circuit.

SUMMARY OF THE INVENTION

The present invention comprehends the provision in an instrument panel assembly of an improved means for facilitated testing of the indicator means of the instrument panel.

More specifically, the invention comprehends the provision of a test switch and suitable control means associated with the different indicating means and the test switch to permit a concurrent test indication of the operability of the individual indicating means.

More specifically, the invention comprehends providing such a test circuit utilizing a plurality of electrical devices permitting only a unidirectional flow of current so as to avoid false concurrent energization of the individual indicating devices as a result of the connection of any one of the indicating devices by the normal control means to indicate a single malfunction.

In the illustrated embodiment, the indicating means comprises a plurality of indicator lamps and the current controlling means comprises a corresponding plurality of diodes connected one each to the respective lamps and to a control switch. The circuit is arranged so that upon closing of the control switch, each of the operable indicator lamps will be illuminated, thereby immediately identifying to the user any inoperable lamp to permit its replacement and thereby avoid a failure of indicating of a malfunction of the apparatus being supervised by the instrument panel.

The invention further comprehends the provision of a signaling system for use in a vehicle or the like including one or more alarms for providing information as to malfunctioning of corresponding components of the vehicle. The alarms may be associated one each with different ones of the instrument panel indicator lamps so as to be operated in parallel therewith whereby the system provides not only an indication of malfunctioning of the vehicle component by way of the instrument panel indicator lamp, but, at least in certain instances, by separate alarm.

More specifically, the signaling system may be arranged to provide a plurality of different alarms as an indication of a malfunctioning of one or more of the components of the vehicle, to provide a single alarm as an indication of a malfunctioning of one or more of different components of the vehicle, and to provide only an indicator lamp indication on the instrument panel as an indication of malfunctioning of one or more further different components of the vehicle.

More specifically, the invention comprehends the provision of such a signaling system in a vehicle having an oil system for lubricating the engine of the vehicle, a hydraulic system for operating hydraulically operable means of the vehicle, and means for generating electricity in the vehicle operation. The signaling system may include first, second and third indicating lamps connected in parallel, a first control switch in series with the first indicating lamp, a second control switch in series with the second indicating lamp, and a third control switch in series with the third indicating lamp, a first alarm, and a second alarm, at least one of the control switches being associated with at least one of the engine oil system, hydraulic system, and generating means to be closed as an incident of a malfunction thereof, circuit means for connecting the first and second alarms in parallel with the first indicating lamp for concurrent operation thereof upon closing of the first control switch, and concurrently connecting the first alarm in parallel with the second indicating lamp for concurrent operation of only the first alarm and second indicating lamp upon closing of the second control switch, the third control switch controlling the operation of the third indicating lamp independently of operation of the alarms.

At least one of the alarms may comprise an intermittent alarm, such as a flashing light and/or an intermittent audio signal.

The system is arranged so that the test switch may test not only the operability of the indicator lamps, but concurrently the operability of the associated alarms.

In the illustrated embodiment, diodes are connected in the circuit means for preventing cross flow between the different alarms and indicator lamps. Further, in the circuit means, diodes may be connected to prevent cross flow between the different indicator lamps and alarms upon closing of the test switch.

Thus, the instrument panel assembly and signaling system of the present invention are extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a vehicle in which an instrument panel assembly of the present invention may be installed;

FIG. 2 is a front elevation of the instrument panel;

FIG. 3 is a vertical section taken substantially along the line 3—3 of FIG. 2;

FIG. 4 is a schematic wiring diagram illustrating the improved lamp testing circuit of the instrument panel assembly;

FIG. 5 is a fragmentary schematic wiring diagram illustrating the use of a battery as the power source; and FIG. 6 is a schematic wiring diagram illustrating a signaling system embodying the invention further including a plurality of alarms associated with different ones of the indicator lamps.

DESCRIPTION OF THE PREFERRED EMBODIMENTS

In the exemplary embodiment of the invention as disclosed in FIGS. 1-5 of the drawing, a instrument panel generally designated 10 is adapted for use in a vehicle, such as a loader, generally designated 11, and more specifically may be arranged to be mounted in the cab 12 thereof adjacent the steering wheel 13 for monitoring of the vehicle components by the driver when the vehicle is in use. Such instrument panels conventionally include a plurality of indicators 14 having a corresponding plurality of indicator lamps 15 which are selectively illuminated such as for indicating malfunctioning or other conditions of the vehicle components.

The instrument panels may include other instrumentation, such as instrumentation 16 shown in FIG. 2. The present invention, however, is directed to an improved means for testing the lamps 15 of the indicators 14 to effectively avoid a failure of indication as by a burnout or malfunction of the indicator lamps.

Referring now to FIGS. 3 and 4, instrument panel 10 comprises an assembly having a front panel portion 17 through which indicator lamps 15 may be selectively viewed. The indicator lamps are connected in a circuit generally designated 18 and are arranged to be energized therein from a power source, which illustratively may include a transformer 19 which may have a low voltage secondary 20 connected at one end to ground 21. The other end of transformer secondary 20 may be connected to each of the indicator lamps 15 so as to provide a parallel connection therebetween. Each of the indicator lamps, in turn, may be controlled by a suitable normally open switch 22 connected between the respective lamps 15 and ground 21.

As indicated briefly above, the present invention comprehends an improved test circuit generally designated 23 for testing the lamps 15 when desired by the user.

More specifically, test circuit 23 includes a normally open switch 24 having its moving contact 24a connected to ground 21 and its fixed contact 24b connected to a parallel arrangement of a plurality of diodes 25 connected one each to between the respective indicator lamps 15 and control switches 22. In illustrating the invention, two such lamps and associated control diodes are shown, it being understood that the invention comprehends the provision of any number of such lamp and diode combinations in parallel.

More specifically, each lamp 15 is connected to its associated control switch by a connection 26. Diodes 25 are connected one each to the respective connections 26 so as to be connected in series one each with the respective lamps. The diodes, in turn, are connected to a common connection 27 to which fixed contact 24b of switch 24 is connected.

As shown in FIG. 5, the power supply to control circuit 18 may comprise a direct current power supply, such as a conventional battery, 28 connected between ground 21 and the common connection 29 to each of the indicator lamps 15.

As shown in FIG. 3, diodes 25 may be mounted on a panel 30 carried on the rear of instrument panel 17.

When it is desired to test the operability of the indicator lamps 15, the user need merely close control switch 24, which, as shown in FIG. 2, may be provided with a manual actuator 31, disposed for facilitated selective manipulation by the user such as at a lower portion 32 of the instrument panel 10. Closing of switch 24 completes a circuit through each of the operable lamps 15 and diodes 25, through the switch to ground 21. Thus, each operable lamp 15 is concurrently energized so as to provide an immediate indication to the user of the operability of the lamps. Any lamp which is not so illuminated upon the closing of switch 24 may be readily replaced by the removal of thelens 33 of the indicator 14 with which the defective lamp is associated, from forwardly of the instrument panel 10. In the event the replacement of the bulb does not effect illumination thereof upon retesting of the circuit by reclosing switch 24, the user is apprised of a malfunctioning of that particular portion of the control circuit 18 so that suitable servicing can be effected to remedy the defect.

Diodes 25 prevent spurious parallel operation of the lamps as by the closing of any one single control switch 22 as a result of the parallel connection of each of the lamps to the single test 24. Thus, each of the diode as 25 broadly comprehends a unidirectional current element which prevents backfeed from one lamp 15 circuit to another lamp 15 circuit while yet permitting facilitated rapid testing of the individual lamps by one single pole, normally open switch.

Thus, the instrument panel assembly test means of the present invention is extremely simple and economical of construction while yet providing an improved rapid testing of the indicating lamps of the instrument panel, thereby avoiding the serious problem of failure of the individual lamps to properly indicate a malfunction of the vehicle component because of a burnout or other inoperable condition of the particular lamp circuit portion.

Referring now more specifically to the embodiment of FIG. 6, a modified form of signaling system, or circuit, generally designated 40 is shown to include a plurality of indicator lamps 41, 42, 43, 44, 45 and 46, which may be provided as a portion of a modified instrument panel assembly. As shown in FIG. 6, each of the lamps is connected to one side of the power supply of the vehicle 11 and, more specifically, may be connected to a power supply lead 47 which, in turn, may be connected to the alternator-generator 48 of the vehicle through a current limiting device 49, which illustratively may comprise a lamp so as to function in the manner of a fuse in protecting the circuit 40.

As will be obvious to those skilled in the art, the indicator lamps may be utilized for providing indicating signals relative to any one of a plurality of different functions of the vehicle. To illustrate such utilization of the indicator lamps, indicator lamp 41 is shown to be connected through a first control switch 50 to the grounded side of the generator 48, with switch 50 being controlled, for example, by a control device 51 responsive to the temperature of the transmission oil of the vehicle so as to close the switch when the transmission oil temperature rises to a preselected level.

Further illustratively, indicator lamp 42 may be connected through a switch 52 to ground and may be controlled illustratively by a control device 53 responsive to the engine oil pressure in the vehicle so as to close switch 52 when the engine oil pressure drops below a preselected level.

Indicator lamp 43 may be connected through a switch 54 to ground with switch 52 being illustratively controlled by a control device 55 responsive to the temperature of the cooling means of the engine so as to close switch 54 and operate indicator lamp 43 when the cooling temperature rises above a preselected level.

Indicator lamp 44 may be connected through a switch 56 to ground, switch 56 illustratively being controlled by a control device 57 responsive to the temperature of hydraulic fluid utilized in the operation of the vehicle.

Indicator lamp 45 may be connected through a switch 58 to ground, switch 58 illustratively being controlled by a control device 59 responsive to the voltage output of the alternator 48 so as to close switch 58 and operate indicator lamp 45 when the power supply voltage is below a preselected level.

Indicator lamp 46 may be connected through a switch 60 to ground, switch 60 being controlled by a control device 61 responsive to the setting of the parking brake of the vehicle so as to close switch 60 and energize indicator lamp 46 when the parking brake is set.

The invention comprehends the provision of a plurality of additional alarms for use in parallel with different ones of the indicator lamps discussed above. Thus, as shown in FIG. 6, a flasher 62, which may be of conventional construction, is connected to a parallel connection of a buzzer 63 and a warning lamp 64 from power supply lead 47. Buzzer 63 is connected through a first diode 65 to switch 50 and through a second diode 66 to switch 54 so that when either of switches 50 or 54 is closed not only is the corresponding indicator lamp 41 or 43 energized, but also buzzer 63 is concurrently intermittently energized through its connection to power supply lead 47 through flasher 62.

As further shown in FIG. 6, warning lamp 64 is connected in series with the parallel connection of diodes 65 and 66 through a third diode 67 so that warning lamp 64 is concurrently intermittently energized with the intermittent energization of buzzer 63 by the closing of either switch 50 or 54 as discussed above.

As further shown in FIG. 6, lamp 64 is connected through a fourth diode 68 to switch 56 and through a fifth diode 69 to switch 52. Thus, when either of switches 56 or 52 is closed, not only is the indicator lamp 44 or 42 associated therewith energized, but also the warning lamp 64 is intermittently energized to provide a further improved indication of the specific malfunctioning sensed by the associated control device.

It may be noted that switches 58 and 60 are not connected to either of the buzzer 63 or warning lamp 64 so that closing thereof effects only the energization of the associated indicator lamp 45 or 46. Thus, it may be seen that the invention comprehends the provision of a plurality of different indicator arrangements in the circuit 40 so that a concurrent energization of an associated intermittently operated buzzer and warning lamp is effected upon energization of one or more of the indicator lamps, concurrent intermittent energization of the warning lamp only is effected upon energization of one or more different ones of the indicator lamps, and one or more of the indicator lamps may be energized without any concurrent additional warning signal being provided.

As discussed above relative to circuit 18, the invention further comprehends the provision of a plurality of diodes connected between the switches and their respective associated indicator lamps and in series with a test switch generally designated 70 to ground. More specifically, as shown in FIG. 6, the connection between lamp 41 and switch 50 is connected through a first test diode 71 to switch 70, the connection between switch 52 and lamp 42 is connected through a second test diode 72 to switch 70, the connection between switch 54 and lamp 43 is connected through a third test diode 73 to switch 70, the connection between switch 56 and lamp 44 is connected through a fourth test diode 74 to switch 70, the connection between switch 58 and lamp 45 is connected through a fifth test diode to switch 70, and the connection between switch 60 and lamp 46 is connected through a sixth test diode 76 to switch 70.

Thus, closing of switch 70 effectively connects each of the indicator lamps from power supply lead 47 directly to ground through the test diodes so as to cause energization of all operative indicator lamps. At the same time, the closing of switch 70 causes energization of the intermittently operated buzzer 63 and warning lamp 64 through connections thereof to test diodes 71, 72, 73 and 74, respectively, thereby concurrently providing an indication of the operability of the buzzer and warning lamp as well as the individual indicator lamps. Similarly, a malfunction of the flasher 62 may be indicated by a concurrent nonenergization of the buzzer and warning lamp upon closing of the test switch 70.

The test diodes effectively preclude cross flow of current between the differrent indicator lamps, buzzer and warning lamp in the same manner as such cross current flow is prevented in the circuit of the first above described embodiment.

Each of the diodes of circuit 40 may be mounted on a single panel, such as panel 30 of FIG. 3, which, in turn, may define a plug-in assembly for facilitated servicing and replacement of the control.

The indicating means of the present invention provides a facilitated indication of the operating condition of the key elements of the vehicle so as to provide improved low cost and low maintenance operation thereof. Thus, in the illustrated embodiment of the vehicle, the control devices provide monitoring of different conditions of the vehicle elements, such as the pressure of the oil in the oil system generally designated 77 of the vehicle engine 78, condition of the hydraulic oil in the hydraulic system 79 for operating the hydraulic devices, such as piston devices 80 of the loader bucket 81, etc.

The facilitated testing of the indicating means further effectively assures proper indication of the malfunctioning of the vehicle components intended to be indicated by the different indicator lamps. The use of the buzzer and lamp in parallel with different ones of the indicator lamps further provides a warning relative to malfunctioning of certain ones of the indicator lamps as the circuit effects an operation of the additional buzzer and warning lamp means notwithstanding burnout of the associated indicator lamps. Thus, operation of either or both of the buzzer and warning lamp without concurrent operation of a indicator lamp serves as an additional means for warning the vehicle operator of the burnout of an indicator lamp and thereby indicating the need for testing the indicating circuit means as discussed above.

The foregoing disclosure of specific embodiments is illustrative of the broad inventive concepts comprehended by the invention.

The embodiments of the invention in which an exclusive property or privilege is claimed are defined as follows:

1. In a signaling system having a plurality of indicator lamps connected in parallel, a corresponding plurality of control switches connected respectively in series with said indicator lamps for selectively energizing said lamps, and an alarm, the improvement comprising
circuit means for connecting said alarm in parallel with a first portion only of said plurality of indicator lamps for concurrent operation of said alarm and first portion of the lamps upon closing of any of the control switches associated therewith to energize the associated indicator lamps of said first portion and permitting energization of the remainder of said lamps by their associated control switches without energization of said alarm.

2. The signaling system of claim 1 including means for causing said alarm to be energized intermittently.

3. The signaling system of claim 1 wherein said alarm comprises a warning light.

4. The signaling system of claim 1 wherein said alarm comprises an audio alarm.

5. The signaling system of claim 1 further including means for testing the operability of said alarm including a test switch and means for connecting said test switch in parallel with each of said control switches.

6. The signaling system of claim 1 further including means for concurrently testing the operability of each of said indicator lamps including a test switch and means for connecting said test switch in parallel with each of said control switches.

7. The signaling system of claim 1 further including means for concurrently testing the operability of said alarm and said indicator lamps including a test switch and means for connecting said test switch in parallel with each of said control switches.

8. The signaling system of claim 7 further including means for limiting the current to said means for testing.

9. In a signaling system having a plurality of indicator lamps connected in parallel, a corresponding plurality of control switches connected respectively in series with said indicator lamps for selectively energizing said lamps, and a plurality of alarms, the improvement comprising
circuit means including first means for connecting said plurality of alarms in parallel with a first portion only of said plurality of indicator lamps for concurrent operation thereof upon closing of any of the control switches associated therewith to energize the associated indicator lamps, and second means for connecting a portion only of said plurality of alarms in parallel with a second portion of said plurality of indicator lamps different from said first portion thereof for concurrent operation of said portion of the alarms and said portion of the lamps upon closing of the control switches associated with said second portion of the plurality of indicator lamps.

10. The signaling system of claim 9 wherein one of said alarms comprises a visual alarm.

11. The signaling system of claim 9 wherein one of said alarms comprises an audio alarm.

12. The signaling system of claim 9 wherein said first means comprises means for connecting all of said alarms in parallel with said first portion of the indicator lamps.

13. The signaling system of claim 9 wherein said second means comprises means for connecting only one of said alarms in parallel with said second portion of the indicator lamps.

14. The signaling system of claim 9 wherein said first and second portions of said plurality of indicator lamps total less than all of said indicator lamps whereby a third portion of said plurality of indicator lamps is arranged to be energized free of concurrent energization of any of said plurality of alarms.

15. The signaling system of claim 9 further including means for concurrently testing the operability of each of said alarms and said indicator lamps including a test switch and means for connecting said test switch in parallel with each of said control switches.

16. The signaling system of claim 9 further including means for concurrently testing the operability of each of said alarms and said indicator lamps including a test switch and means for connecting said test switch in parallel with each of said control switches and a lamp connected in series with said test switch adapted to become open circuited upon the current passing through the test switch reaching a preselected high level.

17. In an instrument panel assembly having a display panel having a vertical portion carrying first instrumentation and a plurality of electrical indicator lamps adjacent said first instrumentation, said panel further having a downwardly facing portion spaced from said vertical portion, an electrical power source having first and second terminals, means connecting the lamps in parallel to said first terminal of the power source, and control switches connected one each in series with the respective lamps and in parallel to said second terminal of the power source for providing selective energization of said lamps from said power source, an improved lamp testing circuit comprising:

- a normally open manually operable test switch carried by said panel downwardly facing portion in adjacent spaced relations to said indicator lamps, said switch being electrically connected to said second terminal and being spaced rearwardly of said vertical portion of the display panel to avoid inadvertent accidental throwing thereof;
- a plurality of lenses one each covering said lamps on said panel, said lenses being removable from forwardly of the panel to permit replacement of each lamp individually from forwardly of said panel;
- a plurality of diodes carried on the rear of said panel in rearwardly spaced relation to said indicator lamps, said diodes being electrically connected one each to between the respective connected lamps and control switches and through said test switch to said second terminal, all of said diodes being arranged to permit current flow in the same direction relative to said test switch, whereby closing of the test switch causes concurrent energization of each operative lamp from said power source, said test switch having a moving contact connected solely to said second terminal and a fixed contact connected solely to said diodes whereby closing of said switch makes an electrical connection from said second terminal solely to said diodes thereby effectively positively providing an indication of the operative condition of each lamp; and
- an alarm associated with one of said control switches to be operated and tested concurrently with its associated indicator lamp.

18. The instrument panel assembly of claim 17 wherein an additional alarm is provided associated with a control switch whereby said alarms may be operated and tested concurrently with their associated indicator lamps.

* * * * *